(12) United States Patent
Franceschini et al.

(10) Patent No.: US 8,874,846 B2
(45) Date of Patent: Oct. 28, 2014

(54) MEMORY CELL PRESETTING FOR IMPROVED MEMORY PERFORMANCE

(75) Inventors: Michele M. Franceschini, White Plains, NY (US); Ashish Jagmohan, Irvington, NY (US); John P. Karidis, Ossining, NY (US); Luis A. Lastras-Montano, Cortlandt Manor, NY (US); Moinuddin K. Qureshi, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/619,451

(22) Filed: Sep. 14, 2012

(65) Prior Publication Data

US 2013/0013860 A1    Jan. 10, 2013

Related U.S. Application Data

(63) Continuation of application No. 13/151,043, filed on Jun. 1, 2011, now abandoned.

(51) Int. Cl.
*G06F 12/00* (2006.01)
*G06F 12/08* (2006.01)

(52) U.S. Cl.
CPC ............... *G06F 12/00* (2013.01); *G06F 12/08* (2013.01)
USPC ................... 711/118; 711/154; 711/E12.001; 711/E12.017

(58) Field of Classification Search
CPC ... G06F 11/1072; G06F 12/0246; G06F 1/26; G06F 1/3296
USPC .......... 711/118, 103, E12.008, E12.001, 154; 714/773, 763

See application file for complete search history.

(56) References Cited

U.S. PATENT DOCUMENTS

| | | | |
|---|---|---|---|
| 6,075,719 A | 6/2000 | Lowrey | |
| 6,192,452 B1 * | 2/2001 | Bannister et al. | 711/141 |
| 6,526,481 B1 * | 2/2003 | Shen et al. | 711/147 |
| 7,403,428 B2 | 7/2008 | Higashitani | |
| 7,529,124 B2 | 5/2009 | Cho | |
| 7,870,337 B2 * | 1/2011 | Bell et al. | 711/118 |
| 7,893,419 B2 | 2/2011 | Hudgens | |
| 8,417,873 B1 * | 4/2013 | Karamcheti et al. | 711/103 |
| 2005/0259498 A1 * | 11/2005 | Nangle | 365/226 |
| 2005/0286336 A1 * | 12/2005 | Harari et al. | 365/232 |
| 2007/0189080 A1 | 8/2007 | Liu | |
| 2007/0189107 A1 * | 8/2007 | Kim et al. | 365/238.5 |
| 2007/0280000 A1 * | 12/2007 | Fujiu et al. | 365/185.24 |
| 2008/0165571 A1 | 7/2008 | Lung | |
| 2008/0186755 A1 | 8/2008 | Lung | |

(Continued)

*Primary Examiner* — Tuan Thai
*Assistant Examiner* — Edward Waddy, Jr.
(74) *Attorney, Agent, or Firm* — Cantor Colburn LLP

(57) ABSTRACT

Memory cell presetting for improved performance including a method for using a computer system to identify a region in a memory. The region includes a plurality of memory cells characterized by a write performance characteristic that has a first expected value when a write operation changes a current state of the memory cells to a desired state of the memory cells and a second expected value when the write operation changes a specified state of the memory cells to the desired state of the memory cells. The second expected value is closer than the first expected value to a desired value of the write performance characteristic. The plurality of memory cells in the region are set to the specified state, and the data is written into the plurality of memory cells responsive to the setting.

20 Claims, 7 Drawing Sheets

(56) References Cited

U.S. PATENT DOCUMENTS

| | | |
|---|---|---|
| 2008/0198674 A1* | 8/2008 | Keller .......................... 365/201 |
| 2008/0203376 A1 | 8/2008 | Wicker |
| 2009/0040841 A1* | 2/2009 | Richter et al. ........... 365/189.16 |
| 2009/0046499 A1 | 2/2009 | Philipp |
| 2009/0161421 A1 | 6/2009 | Cho |
| 2009/0198894 A1* | 8/2009 | Walmsley .................... 711/118 |
| 2009/0219759 A1 | 9/2009 | Hung |
| 2009/0268532 A1 | 10/2009 | De Ambroggi |
| 2010/0103726 A1* | 4/2010 | Bae et al. ..................... 365/163 |
| 2010/0165725 A1* | 7/2010 | Bedeschi ...................... 365/163 |
| 2010/0220509 A1 | 9/2010 | Sokolov |
| 2010/0250836 A1* | 9/2010 | Sokolov et al. ............... 711/103 |
| 2010/0332895 A1* | 12/2010 | Billing et al. ..................... 714/8 |
| 2011/0055486 A1* | 3/2011 | Heo et al. ..................... 711/128 |
| 2011/0161571 A1* | 6/2011 | Kim et al. ..................... 711/103 |
| 2012/0137075 A1* | 5/2012 | Vorbach ....................... 711/122 |
| 2012/0221803 A1* | 8/2012 | Stabrawa et al. ............. 711/154 |
| 2012/0250403 A1* | 10/2012 | Wang et al. .................. 365/163 |
| 2012/0272039 A1* | 10/2012 | Muralimanohar et al. ... 711/209 |

* cited by examiner

US 8,874,846 B2

MEMORY CELL PRESETTING FOR IMPROVED MEMORY PERFORMANCE

CROSS-REFERENCE TO RELATED APPLICATION

This application is a continuation of U.S. patent application Ser. No. 13/151,043, filed Jun. 1, 2011, the content of which is incorporated by reference herein in its entirety.

BACKGROUND

The present invention relates generally to computer memory, and more specifically to memory cell presetting for improved memory performance.

It is a common characteristic of storage class memories to have asymmetric read and write latencies. Typically, write latencies are slower than read latencies. Phase-change memory (PCM) is an example of a non-volatile memory that has asymmetric read-write latency, where the write latency is much higher (about 8×) compared to the read latency.

PCM is a non-volatile memory that exploits the property of chalcogenide glass (GST) to switch the material between two states, amorphous and polycrystalline. The amorphous phase has high resistance and the polycrystalline phase has low resistance. The difference in resistivity between the two states is three to five orders of magnitude and data is stored in the form of resistance. The state of a PCM device is changed by applying heat through the use of electrical pulses. Different heat-time profiles are used to switch from one phase to another.

A PCM memory cell can typically be programmed into two states, typically referred to as RESET and SET states. The RESET state is characterized by a high cell resistance value, whereas the SET state is characterized by low cell resistance value.

To RESET the device, a high power pulse of short duration is required. This electrical pulse first raises the temperature of the PCM material above its melting point, typically in excess of 600° C., and is then quickly terminated. The small region of melted material subsequently cools extremely quickly as a result of thermal conduction into the surroundings. This extremely rapid cooling process locks the PCM material into an amorphous state. The small dimensions of typical PCM devices results in a thermal time constant on the order of a few nanoseconds, and thus RESET pulses are short. RESET latency is typically similar to the read latency associated with a PCM cell.

To SET a cell, the amorphous material must be encouraged to crystallize into a polycrystalline state having a lower electrical resistance. This can be accomplished by heating the material above its crystallization temperature but below its melting point for a sufficient length of time. The SET time is limited by the maximum crystallization rate of the material. Reliably crystallizing typical PCM cells made of GST requires heating pulses that are hundreds of nanoseconds in duration. Therefore, the SET latency is much higher (about 8×) compared to the RESET latency. This implies that PCM is not only read-write asymmetric, but also has non-uniformity in the write times. In other words it has data-dependent write latency.

Given that a memory line contains hundreds of bits, it is highly likely, when writing, that both RESET and SET transitions will occur, hence the write latency of PCM array is determined by the slower of the two operations.

Similar considerations apply to the write energy, which is also asymmetric between RESET and SET states. The same considerations can be easily extended to multi-bit devices.

SUMMARY

An embodiment is a method that includes using a computer system to identify a region in a memory. The region includes a plurality of memory cells characterized by a write performance characteristic that has a first expected value when a write operation changes a current state of the memory cells to a desired state of the memory cells and a second expected value when the write operation changes a specified state of the memory cells to the desired state of the memory cells. The second expected value is closer than the first expected value to a desired value of the write performance characteristic. The plurality of memory cells in the region are set to the specified state, and the data is written into the plurality of memory cells responsive to the setting.

Another embodiment is a method that includes using a computer system to identify a region in a memory. The region includes a plurality of memory cells characterized by a write performance characteristic that is reflective of a current state and a desired state of the memory cells. The plurality of memory cells in the region are set to a specified state. A write request that includes write data and that specifies a write address in the memory that does not correspond to the region is received. It is determined whether the write request should be redirected to the region in the memory. The determining is responsive to a state of the computing system and to whether an expected value of the write performance characteristic for writing to the region in the memory is closer to a desired value of the write performance characteristic than an expected value of the write performance characteristic for writing to the specified write address. The write data is written into the memory at the specified write address the memory in response to determining that the write request should not be redirected to the region in the memory. The write data is written into the region in the memory in response to determining that the write request should be redirected to the region in the memory.

A further embodiment is a method that includes scheduling a request to set memory cells of a memory line to a common specified state in response to a cache line attaining a dirty state. The scheduling is performed by a memory controller in a memory system that includes the memory controller. The memory includes memory lines including the memory line. The cache includes cache lines including the cache line. A read request is received at the memory controller. It is determined whether the read request can be serviced faster by temporarily canceling the request. The request is canceled if it is determined that the read request can be serviced faster by temporarily canceling the request. The request is reinitiated in response to the canceling and to a completion of the read operation performed in response to the read request.

Additional features and advantages are realized through the techniques of the present embodiment. Other embodiments and aspects are described herein and are considered a part of the claimed invention. For a better understanding of the invention with the advantages and features, refer to the description and to the drawings.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
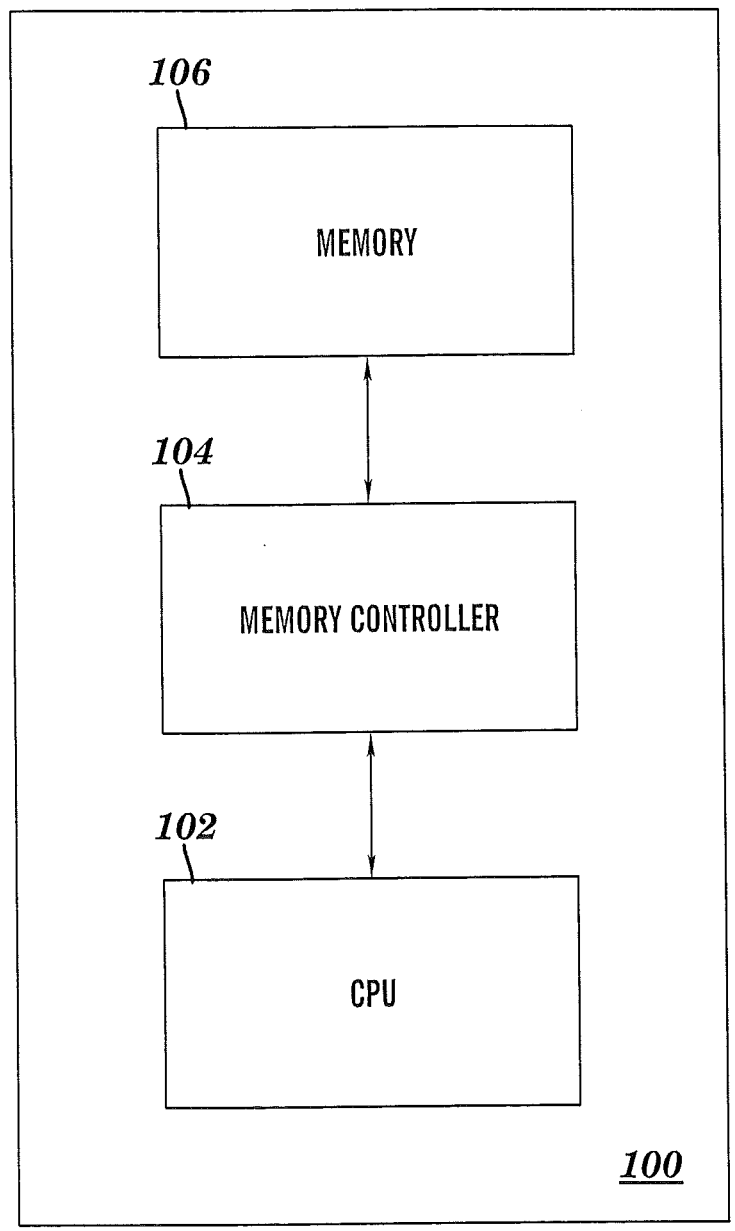
FIG. 1 illustrates a block diagram of a system for storing and retrieving data in a memory in accordance with an embodiment.

An embodiment of the invention provides improved write performance in a memory system where the underlying memory technology has write performance (e.g., in terms of latency, power, and/or bandwidth) that depends on the previous contents of the memory cell. Embodiments apply to memory systems where writing a specific content, such as a RESET state, requires longer latency and/or a larger total amount of power (e.g., energy per unit write) than writing a different content, such as a SET state. Embodiments also apply to memory systems where writing some bit patterns requires more time and/or total amount of power than writing other bit patterns. In memory systems having either or both of these characteristics, the write bandwidth may be improved by using embodiments described herein. An example of a memory that has data-dependent write performance is phase-change memory (PCM), where the total amount of power used or the latency for a write operation may vary up to an order of magnitude depending on the contents written into the memory, or depending on both the previous contents of the memory and the new data pattern to be stored. Moreover, the intrinsic slowness of some write operations in PCM, compared to read operations results in write performance being one of the main bottlenecks in the performance of computer memory systems that use PCM.

An embodiment alleviates the problem of the bottlenecks caused by a slower write by exploiting a fundamental property of PCM devices that writes are slow only in one direction (SET operation) and are almost as fast as reads in the other direction (RESET operation). Embodiments build on top of such a technology by performing fast writes whenever only RESET operations are required to change the contents of the memory into specified contents. A preset mechanism (or preset operation) that proactively SETS all of the bits in a given memory line(s) well in advance of an anticipated write to that memory line is utilized. This allows the write operation to the given memory line(s), when new contents should be stored into the memory line, to incur much lower latency and/or employ smaller amounts of energy. In one embodiment, a preset request is initiated for a memory line as soon as that line becomes dirty in the cache, thereby allowing a relatively large window of time for the preset operation to complete before the updated cache line is written back to memory.

Contemporary approaches to minimizing the impact of asymmetric performance include methods such as: reducing the number of bit-flips while writing in order to reduce the average write power; improving system performance by pausing or canceling high-latency writes, in case a read operation is to be done; modifying database algorithms in order to reduce PCM writes; and reducing PCM write power by using narrow buffer widths. Approaches such as these are directed to improving system performance by reducing the number of write operations (e.g by coalescing), by reducing the number of write bits (e.g. by partial writes), and/or by preempting write operations to minimize their impact on the system (e.g. through write pausing/cancellation). These solutions do not improve the performance of the write operation itself.

Some technologies, such as not-and (NAND) and not-or (NOR) flash memories require a block erase before programming. A shortcoming of this approach is that since a block erase is always required before any cell re-write, the memory does not allow write-in-place, which in turn may lead to problems of write amplification, and the necessity to store very large translation tables in the system.

Embodiments described herein are directed to improving peak write performance by intelligently setting the contents of memory lines prior to writes. By leveraging the bursty nature of writes (i.e., the natural tendency observed in many workloads for writes to cluster into short write bursts followed by periods of relative write inactivity), such an improvement in peak write bandwidth can lead to a significant improvement in system performance. Further, embodiments described herein are complementary to contemporary approaches to alleviating bottlenecks caused by slowness or high energy of write operations (such as those described above) and embodiments may be used in conjunction with these approaches.

The data dependent nature of write latency for a single cell in a PCM is exploited by exemplary embodiments. At a time preceding the actual time at which new contents are written into a memory line, the memory line is set to a preset value that allows the PCM to achieve optimal performance for a selected performance criterion in the subsequent write. In exemplary embodiments, the state in which the memory cells are programmed, in other words, the state into which the memory cells are preset, is the SET state. As used herein, preset and preset operation will also be referred to as setting the memory cells to a common specified state, or setting the memory cells to a specified state. For example, if the criterion is to minimize the latency of the subsequent write, and write latency is dependent on the current contents of the memory, then by presetting the memory to the state that requires the longest latency to be written, such as, in certain single level cell (SLC) PCM technologies, the SET state, minimal write latency can be achieved. In this case, writing includes applying the RESET pulse to the cells that need to be programmed into a RESET state, leaving untouched the cells that should store the SET state. The write latency would normally be the maximum between the write latencies of the two states, and in this way it becomes the latency of the shortest pulse, i.e., the RESET latency. Depending on the different between the latencies this can lead to a significant improvement (e.g., 4×, 8×).

In the above example, the write performance characteristic is latency. The desired value of the latency is zero or close to zero, the first expected value of the latency is the expected latency for writes prior to presetting the memory line, and the second expected value of the latency is the expected latency for writes after presetting the memory line. In addition, the current state of the memory cells is the state (or data values stored) prior to the presetting; the specified state is the state (or data values stored) after the presetting, and the desired state is the state (or data values stored) after the writing is performed. In am embodiment, the actual value of the write performance characteristic for a selected memory cell is not dependent on a current state of other memory cells.

Another example is that of applying preset to minimize the total energy per unit write required by subsequent writes. In a power limited context, this can effectively lead to improved peak write bandwidth. A preset criterion for this can be to preset to the state that requires the highest energy to write. The subsequent write then will not write that state (which is already stored in all memory cells in the preset line) and the write operation will only write states that require low write energy. Upon a bursty write, the effective write power on cells that have been preset is reduced, thus allowing more concurrent writes on a peak power constrained system, ultimately leading to a higher instantaneous peak write bandwidth.

In the above example, the write performance characteristic is energy. The desired value of the energy is zero or close to zero, the first expected value of the energy is the expected energy for writes prior to presetting the memory line, and the second expected value of the energy is the expected energy for writes after presetting the memory line. In addition, the current state of the memory cells is the state (or data values stored) prior to the presetting; the specified state is the state (or data values stored) after the presetting, and the desired state is the state (or data values stored) after the writing is performed.

The observation that presetting can lead to significant benefit is the first cornerstone of embodiments described herein. The second aspect of embodiments described herein is the policy adopted to select the lines that are to be preset and the actual timing of the preset. This is an important aspect since preset by construction is a long latency operation that can get in the way of reads and actual write operations on the memory. Embodiments described herein include a number of polices that may be implemented for different use cases.

One use case has to do with memory locations corresponding to cache lines that have been installed or written to in the cache. A cache line typically contains both 0s and 1s, so the time taken to write back a line into PCM memory is dictated by the slowest write operation that needs to be carried out, e.g., the SET operation. As a consequence, the overall write latency of a PCM array is deemed to be high, which means that the write bandwidth (per independent set of write circuitry) is low. PCM chips are often power-limited, so write bandwidth cannot necessarily be increased by adding more write operations in parallel.

Write bandwidth requirements are typically bursty, so application performance suffers when system write bandwidth is not enough to support the write stream. To this end, embodiments described herein include techniques that help in mitigating the problem of limited write bandwidth whenever a memory that can be overwritten presents a strong data dependency of the memory cell write latency.

At the memory controller level, an additional operation meant to improve the performance of a subsequent write, or to "prepare a write", is introduced and referred to herein as a "preset operation." In an embodiment, the preset operation initializes the contents of memory line to SET, i.e., it places the memory in a state that allows faster subsequent programming before the write operation occurs. Therefore, when the actual write operation occurs, it ends up having a lower latency, thus effectively making write latency much closer to read latency.

Furthermore, since the energy required for a RESET operation is lower than the energy required for a SET operation, the instantaneous or peak write bandwidth can be increased because more (lower-energy, i.e. RESET) operations can be done in parallel on a power-limited chip.

In additional embodiments the preset operation programs the memory cell into a state that minimizes the latency of the subsequent write. Those skilled in the art will recognize that this applies to SLC devices (e.g., single bit per cell) as well as to MLC devices (e.g., multiple bits per cell). Other exemplary embodiments select the preset operation so as to minimize the expected write energy of subsequent writes. This concept can be applied to the maximization of any performance parameter associated with subsequent writes.

Embodiments described herein are concerned with methods for orchestrating the preset operation in advance, in a manner that does not contend with demand requests. The actual value at which the memory is preset can be chosen according to different rules. For example the following rules correspond to different optimality criteria: select as a preset level the level that requires the largest write latency, this reduces the write latency of a large line to that of the second slowest level; select as a preset level the level that requires the largest write energy, this reduces the maximum write energy the second highest value; select as a preset level the level that provides minimum average energy of a subsequent write; assuming that the latency required to program a given level is a function of the value currently stored in the memory cell; and select as a preset level the level that minimizes the latency of the slowest possible write, when starting from a cell storing the preset level.

Use cases supported by exemplary embodiments include, but are not limited to: normal applications (writes are typically bursty), with presetting driven by the setting of the dirty state bit in a particular line in a cache; checkpointing in supercomputers (extremely bursty and predictable workload); context switches in highly virtualized environments; persistent memory systems where write latency is critical; and emergency checkpoint/backup on power down (time constrained due to battery). As used herein, the term "persistent memory" refers to a memory that reliably stores contents and that preserves such capability even upon loss of system power. Such capability can be associated with a memory subsystem or with a memory technology, in which case it is often referred to as nonvolatile memory.

FIG. 1 illustrates a block diagram of a computing system 100 for storing and retrieving data in a memory in accordance with an embodiment. The system 100 depicted in FIG. 1 includes a computer processor 102, a memory 106 (e.g., a PCM) having memory cells, and a memory controller 104 for receiving data from the computer processor 102 to be stored in the memory 106. In an embodiment, the memory cells are arranged into cache lines, and cache lines are arranged into pages. Memory content is moved to and from memory with a granularity of a cache line (i.e., transfers are multiple of cache lines) between the memory 106 and the computer processor 102, which may include one or more levels of cache. In exemplary embodiments the presetting happens at a cache line granularity. In other words, the preset operates on an entire cache line.

In one embodiment the memory controller 104 is communicatively coupled to the computer processor 102 and receives write requests from the computer processor 102. The write requests contain data to be written to the memory 106 and a logical address for identifying the location in the memory 106 to which the data will be written. The memory controller 104 stores data at a physical address within the memory 106. In an embodiment, the memory controller 104 maps the logic address to a physical address in the memory 106 when storing or retrieving data. The physical address for a given logical address can change each time data in the memory 106 is modified.

The system 100 is one example of a configuration that may be utilized to perform the processing described herein. Although the system 100 has been depicted with only a single memory 106, memory controller 104, and computer processor 102, it will be understood that other embodiments would also operate in other systems with two or more of the memory 106, memory controller 104, or computer processor 102. In an embodiment, the memory 106, memory controller 104, and computer processor 102 are not located within the same computer. For example, the memory 106 and memory controller 104 may be located in one physical location (e.g., on a memory module) while the computer processor 102 is located in another physical location (e.g., the computer processor 102 accesses the memory controller 104 via a network). In addition, portions of the processing described herein may span one or more of the memory 106, memory controller 104, and computer processor 102.

Figure 2:
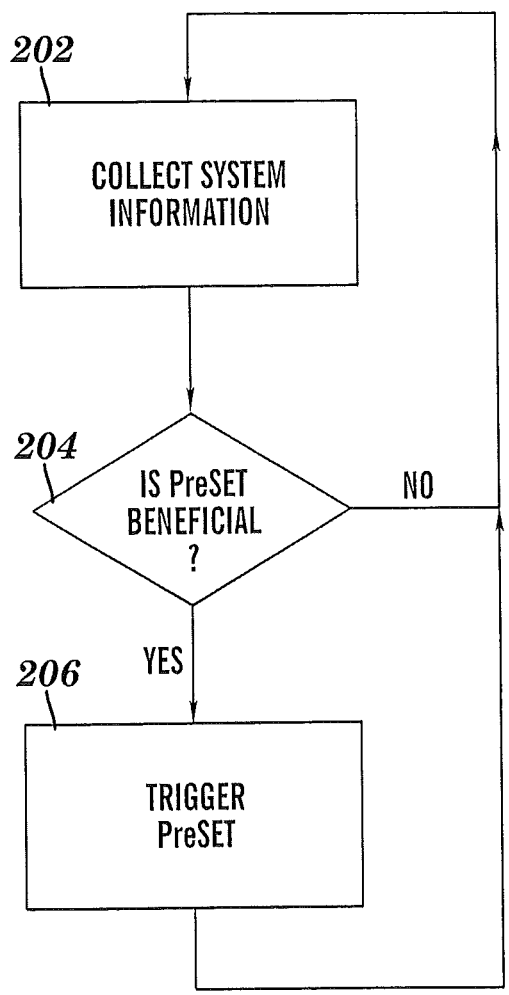
FIG. 2 illustrates a process flow for determining when to trigger a preset in accordance with an embodiment.

FIG. 2 illustrates a process flow for determining when to trigger a preset in accordance with an embodiment. The process flow depicted in FIG. 2 is performed by a computer system, such as system 100 depicted in FIG. 1. In an embodiment, the process flow depicted in FIG. 2 is performed by a memory controller, such as memory controller 104. At block 202, the process collects information on the status, or state, of the computer system. In exemplary embodiments, collecting the status includes but is not limited to: evaluating if there is available bandwidth for performing preset operations, evaluating if performing a preset would lead to a data loss, collecting the current write activity, collecting the current read activity, and identifying the memory lines that have already been preset.

At block 204, the process estimates if the application of preset could be beneficial. In exemplary embodiments, estimating if the application of preset could be beneficial includes but is not limited to: evaluating the likelihood that a write will occur on a line that can be successfully preset, verifying that performing a preset will not hinder the normal execution of the running application, and evaluating the likelihood that performing a preset will improve the performance of the running application. The previous evaluations can be carried out by means of several tools, such as, but not limited to mathematical modeling, system simulation, and/or circuits or computer programs approximating such modeling and simulations. One such example is a look up a queue, such as a write queue or a read queue and deciding whether a preset is expected to be beneficial, by comparing the occupancy of said queues with a threshold. For example, if the queue occupancy is zero, preset can be considered to be beneficial.

If preset would not be beneficial, then processing continues at block 202 to continue to collect system information. If it is determined, at block 204, that preset would be beneficial, then processing continues at block 206 to trigger a preset operation. In exemplary embodiments, the triggering is preceded by an operation that identifies the memory region to be preset, the identifying done by a computing system. In exemplary embodiments the identifying is carried out by a circuit, such as a memory controller that may be in communication with a cache controller. In exemplary embodiments the identifying is carried out by software, such as, but not limited to application software, a hypervisor, and or an operating system. After the preset operation has been initiated, the system returns to the information collection phase at block 202.

One example assumes a generic workload and performs preset on lines marked as dirty (i.e., lines written to in cache that are in a dirty state) in the last level of cache. As used herein, a line becoming dirty or acquiring the dirty state means that a cache line installed into the cache, i.e. stored in the cache line, is written to, possibly with new content for the first time. This usually implies that the cache holds the most current version of the memory line, and that the corresponding contents in main memory may be outdated. In a cache line, a dirty bit signals whether the line has become dirty or not.

In an embodiment, the preset operations have lower priority than reads and writes and, possibly are either "paused" or "canceled" when they are being executed, and a read or a write request arrives at the same memory bank that is performing the preset operation.

Figure 3:
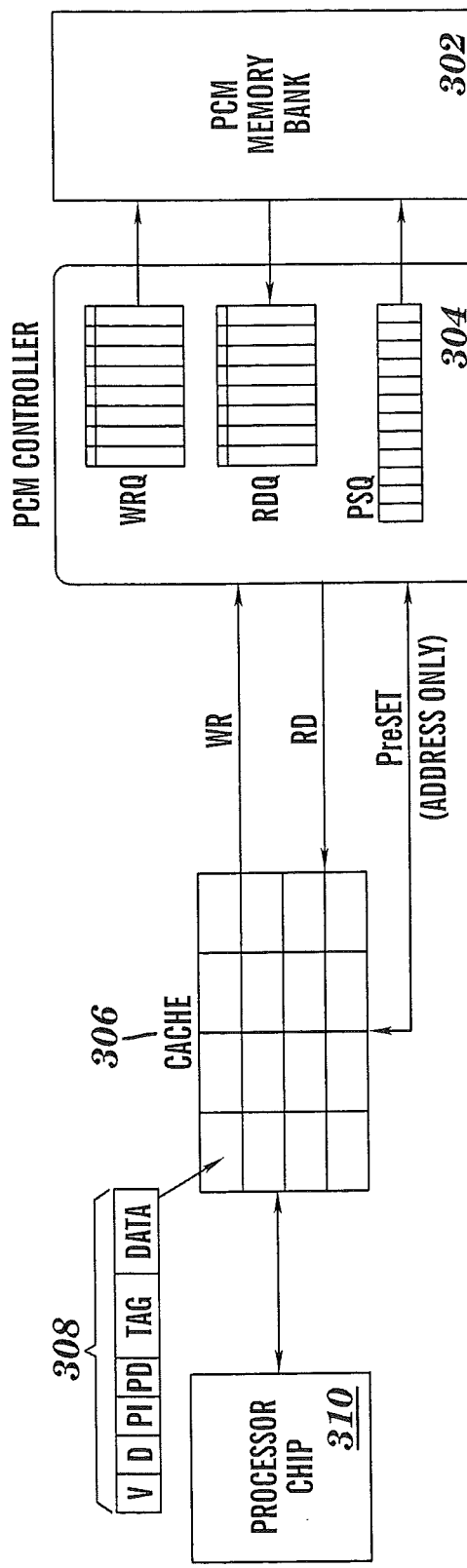
FIG. 3 illustrates a block diagram of a system for utilizing preset in combination with a cache in accordance with an embodiment.

FIG. 3 illustrates a block diagram of a system for utilizing preset in combination with a cache in accordance with an embodiment. FIG. 3 includes a PCM memory bank 302 (storing a plurality of memory lines), a PCM controller 304, a cache 306 (containing a subset of the memory lines), a tag store entry 308, and a processor chip 310. As shown in FIG. 3, the PCM controller 304 includes a preset queue (PSQ), meant to allow scheduling of requests to set memory lines to a pre-specified common state, in addition to a read queue (RDQ) and a write queue (WRQ). In an embodiment, the PSQ is much simpler than the WRQ, in that each PSQ entry stores only address information (e.g., three bytes) whereas a typical WRQ entry stores data as well as addresses (128+3=131 bytes). Therefore, even a PSQ of 128 entries incurs a storage cost of less than four hundred bytes (10× lower than a 32 entry WRQ). In an embodiment, the PSQ is not looked upon for each read access, where the WRQ is always looked upon for each read access. Therefore, the PSQ can be designed as a circular buffer (or a set associative structure).

The tag store entry 308 of the cache 306 is extended to have two more status bits: preset initiated (PI) and preset done (PD). When a write is performed to the cache 306, the dirty bit (D) in the tag store entry 308 is set. A preset operation request is sent to the PCM memory bank 302 only if the PI bit is zero and the PSQ associated with the PCM memory bank 302 has empty space. If the PI bit is set to one, subsequent writes to the cache line will not initiate a preset operation request. When the preset request completes service, the cache 306 is notified to set the PD bit in the tag store entry 308. In additional embodiments, the PI is omitted and the setting of the D bit indicates that a line address has been inserted in the PSQ. Those skilled in the art will recognize that the addition of PI and PD to the cache are a means of keeping track of the preset operations and that such mechanism can be implemented by other means and circuits, such as, for example, tables. In additional embodiments, upon setting of D the preset is sent to the PSQ, upon requesting a preset to the memory device the PI is set and upon completing said preset the PD is set.

Figure 4:
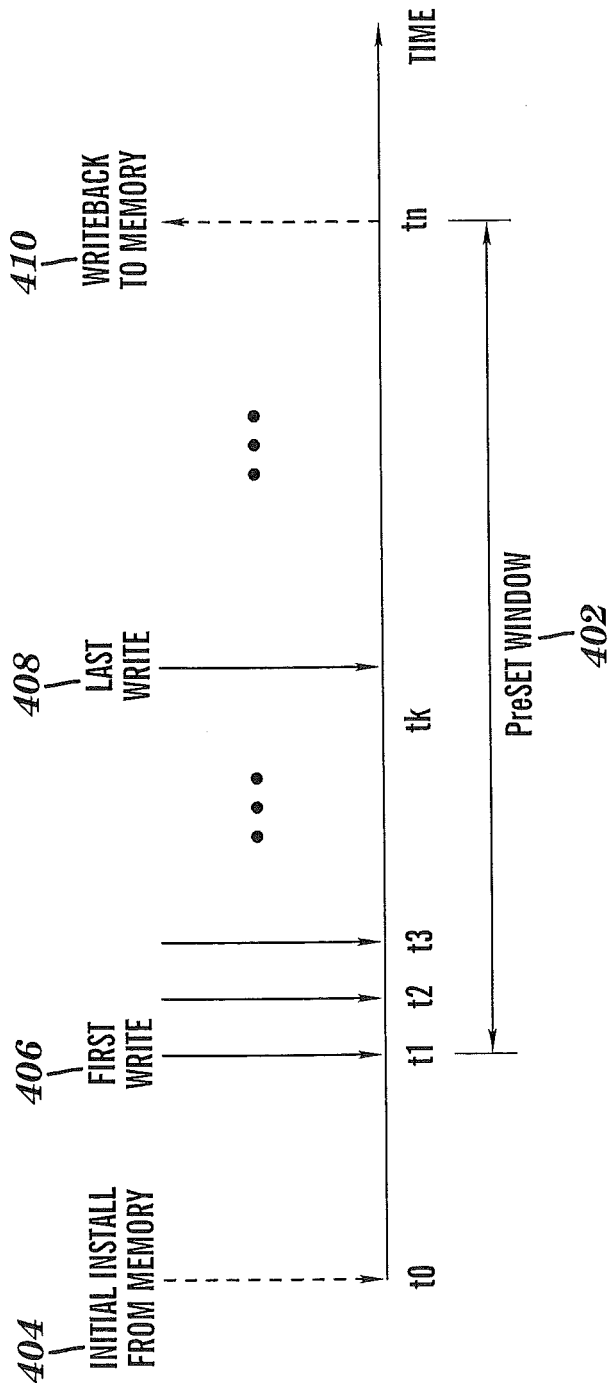
FIG. 4 illustrates a window of time for performing a preset in accordance with an embodiment.

FIG. 4 illustrates a window of time for performing a preset operation in accordance with an embodiment. In an embodiment, a preset operation is not initiated speculatively as performing a preset operation for clean cache lines can result in potential data loss. Therefore, a preset operation is performed by an embodiment only when it is known that the current contents of the line stored in memory will no longer be needed. When a write is performed to a given cache line, the corresponding contents of the line in memory becomes stale and can be discarded. In an embodiment, a preset to a memory line can be initiated as soon as a write to the cache line is performed. In fact, the cache line may be written to multiple times before eviction, but an embodiment initiates only one preset operation for that line, as preset is not dependent on contents of the line.

Referring to FIG. 4, at time t0, which corresponds to an initial install from memory 404 in FIG. 3, a cache line is installed in the cache 306. Sometime later, at time t1, which corresponds to a first write 406, the line gets written (e.g., by a writeback from a lower level cache) for the first time in the cache 306. After that the cache line can be written several times, including a last write 408 at time tk, before being evicted from the cache at time tn, which corresponds to a writeback to memory 410. In an embodiment, the preset request is sent to memory any time after t1 and the present operation must complete before time tn. This time period is labeled in FIG. 4 as the preset window 402. The preset window 402 can be defined in terms of the number of clock cycles between the first write to the cache line and the time when the cache line is evicted from the cache 306. In an embodiment, the preset is performed prior to the write request writing the evicted cache line back to the memory actually reaching the WRQ. In most cases, the preset window 402 is large enough that the preset operation is completed well in advance of the anticipated write back of the cache line to memory.

In an embodiment, in case a preset request is scheduled in the PSQ but has not initiated and a write request to the same line arrives at the WRQ, the request is canceled from the PSQ. In an embodiment, in case the preset operation is initiated but not completed before the cache line actually reaches the WRQ, the preset is canceled. In another embodiment, in case the preset operation is initiated but not completed before the cache line actually reaches the WRQ, the preset is completed before letting the WRQ submit the corresponding write request. In a further embodiment, in case the preset operation is initiated but not completed before the cache line actually reaches the WRQ, the preset is canceled if the expected time to completion has not reached a given threshold, such as, for example, if the expected time for completion is more than 20% of the total expected preset time the preset is cancelled. In an embodiment, in case a preset request has initiated and a read request arrives, the preset is canceled; in general a preset is canceled if it is determined that a read request can be serviced faster. In an embodiment, following the fulfillment or completion of the read request the preset is reinitiated. In exemplary embodiments, a preset request into the PSQ is not scheduled (it is discarded) if the PSQ is full. In exemplary embodiments, the scheduling of a preset request into the PSQ I postponed if the PSQ is full.

An embodiment represents a trade-off between average available write bandwidth and instantaneous peak write bandwidth. In fact, having memory locations that will be written in a preset state will allow maximization of the instantaneous bandwidth since the writes terminate in less time. On the other hand, if for every write both a preset operation and a write operation are performed, the actual write operations per single write become two, thus effectively decreasing the maximum sustained bandwidth.

In an embodiment, optimal results are obtained when a workload exhibits a bursty write pattern. In this case, the preset operation is used to modulate the peak write bandwidth and the average write bandwidth. As used herein, the term "peak write bandwidth" refers to the maximum number of write operations performed in a short pre specified time, such as, for example 100 us. As used herein, the term "average write bandwidth" refers to the number of write operations performed in a long pre-specified (and programmable) time, such as, for example 10 seconds. In general, activating preset lowers the average available bandwidth over time because of the addition of the preset traffic. In addition, if the preset operations exceed the fast write operations (such as RESET operations), the number of preset lines increases and therefore the number of available fast writes increases, thus increasing the available peak bandwidth or the time at which writes can be performed at high speed. In a similar way, performing fast writes decreases the number of available preset lines therefore reducing the potential peak write bandwidth. This happens, for example, whenever there is a bursty write event which depletes preset lines.

Figure 5:
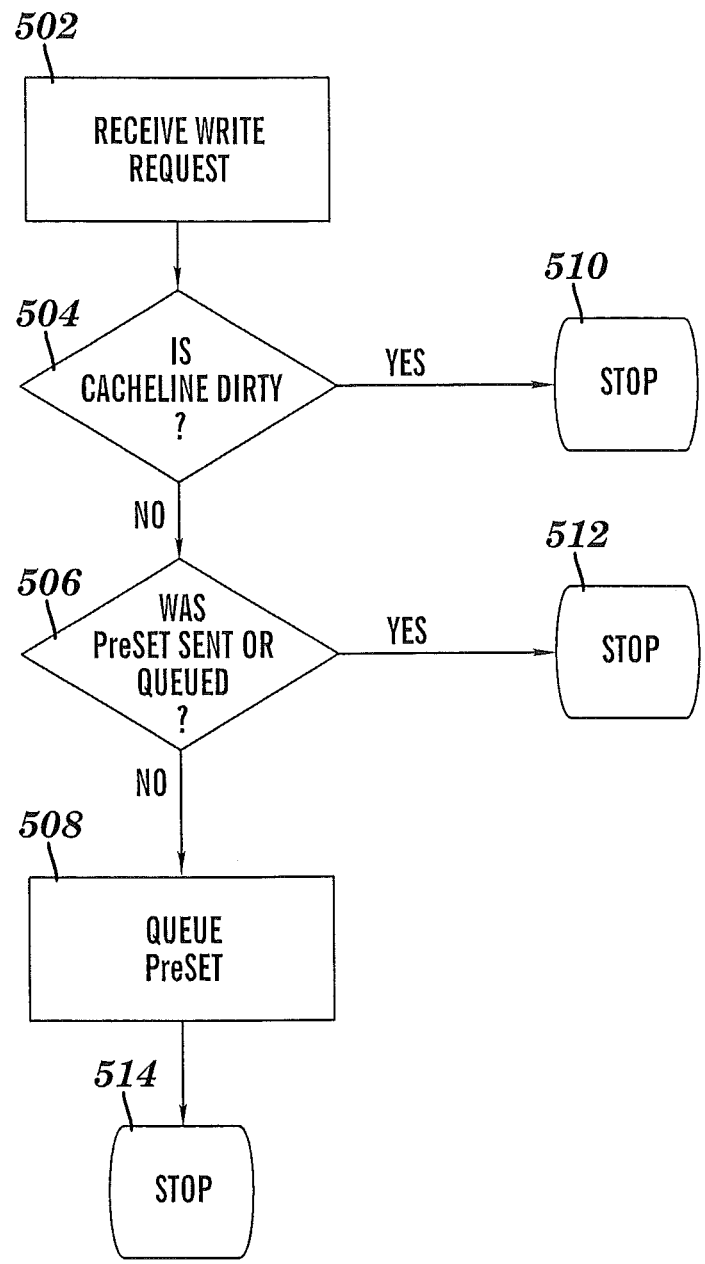
FIG. 5 illustrates a process flow for determining when to initiate a preset operation for a cache line in accordance with an embodiment.

FIG. 5 illustrates a process flow for determining when to initiate a preset for a cache line in accordance with an embodiment. The process flow depicted in FIG. 5 is performed by a computer system, such as system 100 depicted in FIG. 1. In an embodiment, the process flow depicted in FIG. 5 is performed by a memory controller, such as PCM controller 304. In an embodiment, the preset operation is triggered on a first write to a clean cache line in a cache, such as cache 306. At block 502, a write request directed to a line located in cache is received, for example from an underlying cache level or from a processor core. At block 504, it is determined if the cache line is dirty (has it already been written to). If the cache line is dirty, then block 510 is performed and the preset processing is stopped. If the cache line has not attained a dirty state, then at block 506 it is determined whether a preset has previously been sent or queued. If a preset has already been sent or queued, then processing continues at block 512, where the preset processing is halted. If a preset has not already been sent or queued, the processing continues at block 508, where a preset operation is initiated, or scheduled for processing (by being placed in the PSQ). In one embodiment, if the PSQ is full, then the preset operation is canceled. In another embodiment, if the PSQ is full, then the preset operation is postponed. At block 514, preset processing stops.

Figure 6:
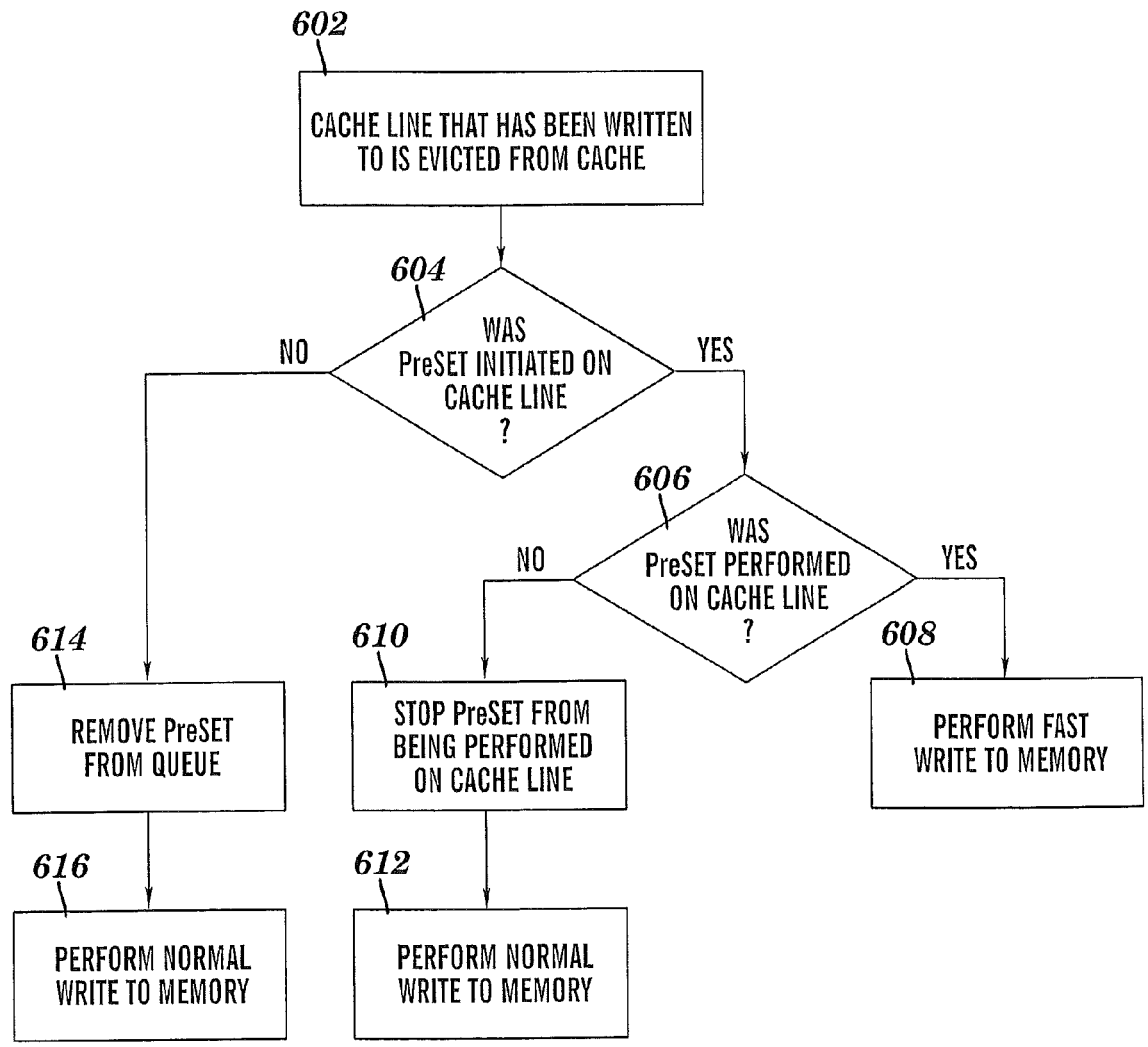
FIG. 6 illustrates a process flow for determining whether to utilize a normal write or a fast write to memory when writing contents of cache line to memory.

FIG. 6 illustrates a process flow for determining whether to utilize a normal write or a fast write to memory when writing contents of a cache line to memory. In an embodiment the processing is performed by a memory controller, such as PCM controller 304. At block 602, a cache line that has been written to (i.e., a dirty cache line) is evicted from the cache. At block 604, it is determined if a preset operation was initiated for the cache line being evicted (e.g., is the PI bit set). If a preset was not initiated, then block 614 is performed to remove the preset operation request from the queue (e.g., the PSQ) and processing continues at block 616 with a normal write to the memory being initiated. As used herein, the term "normal write" refers to a write that utilizes both SET and RESET operations, or, more in general utilizes a variety of programming operation, including highest energy programming operations or highest latency programming operations. If a preset operation was initiated, as determined at block 604, then block 606 is performed to determine if the preset was completed (e.g., is the PD bit set). If the preset was performed on the cache line, then processing continues at block 608 where a fast write to memory is performed. As used herein, the term "fast write" refers to a write where it is assumed that all of the memory cells are at a specified value, such as SET, and that only RESET transitions will occur. In exemplary embodiments this corresponds to a specific programming operation. In exemplary embodiment, the operation requested by the memory controller coincides with that of a normal write and the memory devices recognize that only fast programming operations are required, given the content or the state of the memory line, and performs such fast programming operation, such as a RESET operation.

If the preset was not performed on the cache line, as determined at block 606, then processing continues at block 610. This means that the entry is still in the PSQ. In an embodiment it is important that the unfulfilled or uninitiated preset requests are prevented from being performed otherwise it can result in data loss (if the preset operation is performed after the demand write back to the memory). Therefore, in such a scenario the PSQ entry associated with the cache line is invalidated at block 610. At block 612, a normal write process is used to write the cache line to the memory. In an embodiment, when the memory controller schedules the write operation, from the WRQ to the memory, the PD bit determines whether it should be treated as a normal write or a fast write.

In an embodiment, the preset operation in itself does not require special support from the memory device level (e.g., the PCM memory). The preset operation is similar to a normal write where all data bits are zero (or one, depending on what data value the SET state is mapped to). However, embodiments do rely on the interface to the memory device supporting write commands having two types of write latencies: a normal write and a fast write.

Since in exemplary embodiments preset is only a hint, in other words an additional optional operation that is inserted in the normal stream of operations, it serviced off the critical path, during idle cycles at the memory bank. In an embodiment, an already started preset operation is not canceled if a write request arrives at the memory bank, and the preset operation is allowed to complete before servicing the write request. In another embodiment, an already started preset operation is canceled if a write request arrives at the memory bank. In an embodiment, an already started preset operation is canceled if a read request is received at the memory controller and it is determined that the read request can be serviced faster by temporarily canceling a request to set the cells of a memory line to a specified state. In an embodiment, the preset request is reinitiated to set the cells of the memory line to a common specified state when the read is completed.

An embodiment includes an adaptive preset that enables/disables preset depending on properties of the workload and a typical load on the WRQ.

Another embodiment includes using the preset operation for system checkpointing. System checkpointing is used to perform a safe copy of the system status (e.g., a copy of the system state data) to enable restarting the system from a known state. Checkpointing is typically implemented by copying memory pages. However, page writes will be slow in PCM so write latency becomes critical. An embodiment includes presetting a region of memory prior to storing checkpoint data in the preset region. In an embodiment, the region to be preset is identified by the memory controller. In an embodiment the region to be preset is identified by an operating system, a hypervisor and/or a software application executing on the computing system 100 (e.g., on the computer processor 102).

Periodic checkpointing to persistent storage is a common fault tolerance mechanism employed in high-performance computing using massively parallel processing (MPP) systems. Such systems may employ tens of thousands of nodes; thus, even if the node mean time between failures (MTBF) is on the order of years, the system MTBF may be on the order of only a few hours. The use of checkpointing to periodically save application state allows application rollback and recovery whenever the system is interrupted due to a system failure.

There are several classes of checkpointing techniques. Checkpoints can be coordinated, where all processes synchronously save their state to persistent storage, or uncoordinated, where processes checkpoint independently and communication between processes is logged to allow rollback/recovery. Uncoordinated checkpointing yields potentially superior performance since all processes do not need to be rolled back in case of a failure, but it does so at the cost of increased checkpointing and recovery complexity. Checkpointing can be full-memory, wherein the entire process memory state is saved, or incremental-memory, wherein memory modifications are tracked and only the modified state is saved. Finally, checkpointing may be system-directed or it may be application-directed, and may be performed at regular intervals or, in the application-directed case, may be closely guided by program directives. An example embodiment described herein is directed to a system employing coordinated, full-memory checkpointing performed periodically at regular intervals. In the example embodiment, the checkpointing technique is blocking (i.e., application-related computation is periodically paused on the entire system to allow the checkpoint to be written to persistent storage. Other embodiments, using other checkpointing techniques may also be implemented.

Checkpoint latency and checkpoint interval are fundamental parameters that affect the performance of periodic checkpointing. Checkpoint latency is defined as the time required to write the checkpoint to persistent storage. Checkpoint interval is defined as the time spent by the system on performing application-related computation (i.e. non-checkpointing computation) between two successive checkpoints. For a fixed checkpoint latency, the checkpoint interval yields a trade off between wasted computation and checkpointing overhead. Specifically, if the checkpoint interval is very large there is a high likelihood of system interruptions between any two successive checkpoints, resulting in large rollbacks and large amounts of wasted computation. On the other hand, if the checkpoint interval is very small, the frequent blocking checkpointing operations constitute a large overhead to the system performance. The determination of an optimal checkpointing interval (OCI) that maximizes the useful work performed by the system is an important issue in checkpointing systems. The checkpoint latency has a critical impact on system performance. For a fixed checkpoint interval, reducing the checkpoint latency directly improves useful system utilization by reducing the checkpointing overhead. Alternatively, reducing the checkpoint latency allows a reduction in the checkpoint interval, which reduces wasted computation. In general, reducing the checkpoint latency reduces the OCI, and improves useful system utilization by reducing both wasted computation and checkpointing overhead. With MPP system sizes expected to grow rapidly, system MTBF will continue to decrease, and reducing checkpoint latency can be expected to become even more important for system performance.

Checkpointing latency in a system using blocking, coordinated, full-memory checkpointing is constrained primarily by the bandwidth of the I/O subsystem. This is due to the large quantity of data which constitutes the checkpoint and that is required to be written to the I/O subsystem during checkpointing. Given the limited write bandwidth possessed by traditional hard-disk drive based storage systems, storage-class memory (SCM) based systems present a natural alternative. The importance of checkpoint latency, and its strong dependency on the write-performance of the checkpointing subsystem, makes preset an attractive candidate for use in a checkpointing system. While providing higher write-performance superior to hard-disk drives, PCM write bandwidth is constrained by the latency of the SET operation, and is significantly smaller than, for example, PCM read bandwidth. Applying the preset operation prior to checkpointing reduces the checkpoint latency, and thereby improves system performance. The use of preset is ideally suited for a typical checkpointing system, wherein the write bandwidth usage to the checkpointing subsystem is relatively low during the intervals between checkpoints.

Figure 7:
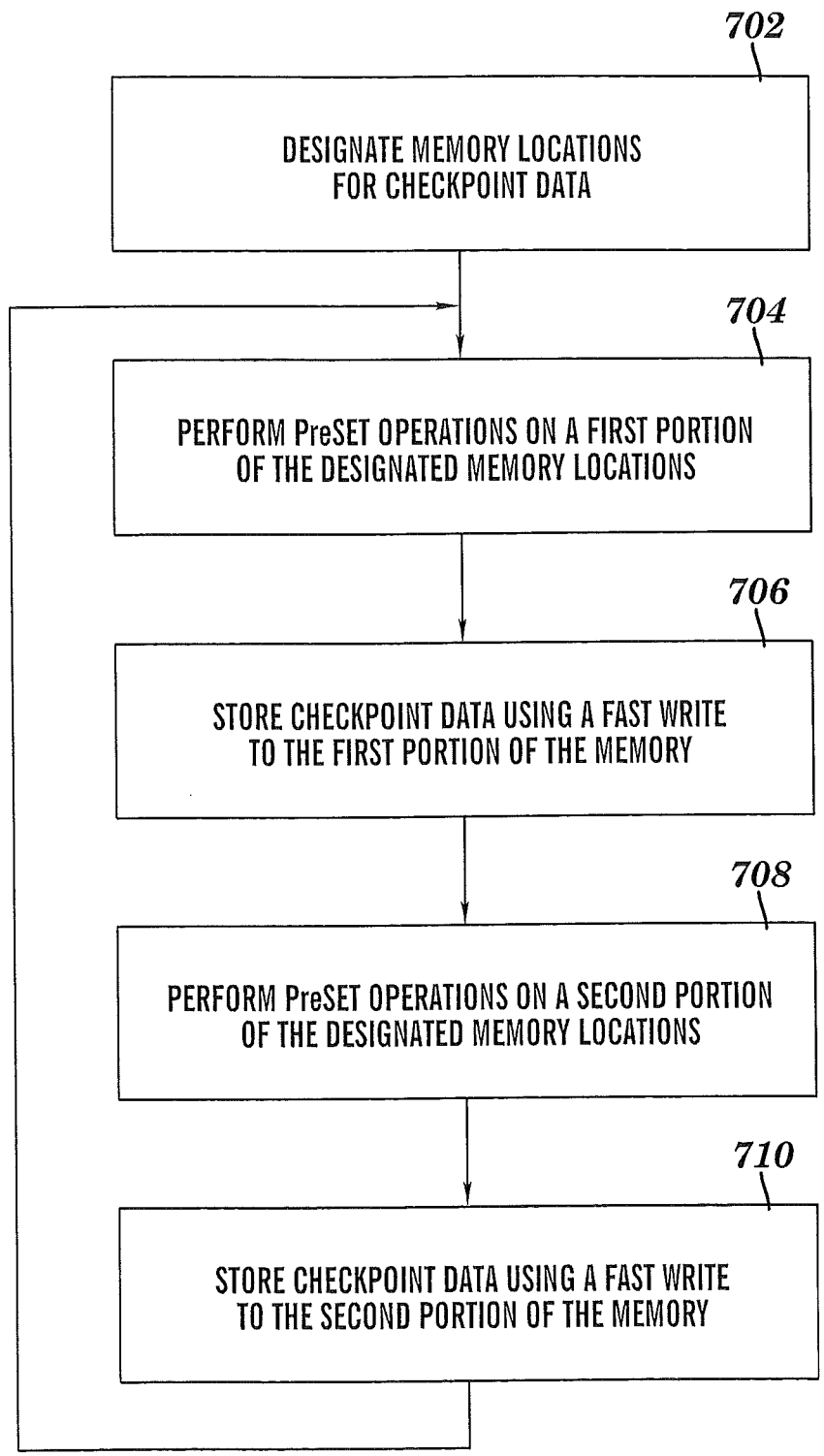
FIG. 7 illustrates a process flow for utilizing preset in combination with a checkpoint operation in accordance with an embodiment.

FIG. 7 illustrates a process flow for utilizing preset in combination with a checkpoint operation in accordance with an embodiment. In an embodiment, the processing is performed by a computer system, such as system 100. In an embodiment, the processing depicted in FIG. 7 is performed by a memory controller, such as memory controller 104. At block 702, memory locations on a PCM are identified (e.g., by an operating system, a hypervisor, and/or a software application) and designated as locations for storing checkpoint data. At block 704, a preset operation is performed on a first portion of the designated memory locations. Checkpoint data is stored using a fast write into the first portion of the designated memory at block 706. At block 708, a preset operation is performed on a second portion of the designated memory locations, followed by storing checkpoint data into the second portion using a fast write at block 710. Processing then continues at block 704 where a preset operation is performed on the first portion of the designated memory locations. Embodiments may implement any number of portions of memory locations to be reset and are not limited to two portions of memory locations as shown in FIG. 7. In addition, the processing of blocks 706 and 708, as well as 710 and 704 may overlap in time.

When blocks 704 and 708 in FIG. 7 are being performed, the system is concurrently doing useful computations. In other words, the region of memory that will be storing the next checkpoint is being preset during the normal operation of the system. This way when the epoch finishes, the checkpoint writes will happen at a faster rate.

Another embodiment is an out-of-place preset. When a large number of cache lines are evicted from the cache, and no presets have been performed, then the memory system can handle such bursty write traffic by out-of-place preset. In an embodiment, a small percentage of memory is always kept in the preset state. So, when a large number of lines are to be written, they are simply redirected and written to a quick write area (QWA), also termed a persistent write buffer (PWB), that is kept in the preset state. In exemplary embodiments, a memory controller collects the state of the computing system, the state including: a loss of power, a need for low write latency, a need for high write bandwidth. In exemplary embodiments, a memory controller determines if the redirection should happen based on the previous collected state. For example if low latency write is needed, a redirection to the QWA happens. In an embodiment, the processor includes a separate line redirection table (LRT) that indicates if the line being accessed in memory is actually in the QWA and at what location in the QWA. As the memory burst is occurring/ends and there are spare cycles in the banks, the lines kept in QWA are moved to their original location and the corresponding LRT entry is invalidated. The operation order is chosen so that the data is always present in the memory in a recognizable location and therefore can be considered as persistent. This can be achieved for example by invalidating the contents of the LRT after writing to the original location, and having the invalidation to be performed in two steps (which can coincide) of first setting a bit that invalidates the line and afterwards erasing the corresponding contents of the LRT. A subsequent read will be fulfilled through LRT lookup only if the corresponding line is valid, and in all other cases it will be fulfilled by reading the actual original memory location (as specified by the address to be read).

If the desired PWB is large, then an LRT with fast lookup capabilities may become infeasible. In exemplary embodiments, an architecture where each line in the PCM memory is augmented with a single bit that informs the memory controller whether the corresponding data has been redirected to the PWB is implemented. The bit is normally kept in SET mode, so that it can programmed to its opposite logical value (through a RESET) very quickly. In order to encode the location within the PWB (i.e., a memory region that has been identified and preset) to which the line was redirected, having only to RESET bits is desirable, in order to make the writing very fast, and generally a write performance characteristic of low latency or low energy.

The following describes an embodiment. Suppose that the line size in the PCM is N bits and it is desired to encode a M bit location within the PWB memory region in the N bits, where M divides N. The N bits $b0 \ldots bN-1$ are partitioned into M groups $G0, \ldots, GM-1$ of N/M bits each. Each group will identifies one bit of the location $a0 \ldots aM-1$. If a given desired location bit $ai$ is "1", then all the bits in the group $Gi$ are RESET; if it is "0" then the data of $Gi$ is left untouched. If in each of the M groups there is at least one cell that is in the SET state then the location can be recovered for any locations within the PWB where a write may be desired. After the write action just described, the memory controller reads the line stored to determine whether this is the case. If it is found that the location is unrecoverable, then the either the location has to be rewritten by SETing at least one cell on each group that needs it, or a normal (not out place) write happens to the PCM memory. Under the assumption that the data stored in PCM is comprised of bits chosen independently and uniformly at random, it can be easily seen that for the case N=1024 and M=32, the probability is less than 10-8 percent.

In another embodiment, preset is used with persistent memory systems. The use of storage class memory (SCM) as a persistent memory in a system is made desirable by the much lower latency of SCM as compared with traditional persistent storage. Therefore for successful implementation of persistent memory systems, write latency of memory is critical. In this embodiment, out-of-place preset is used to reduce write latency and to improve performance of persistent memory systems. In this embodiment, the QWA allocation is limited to all the persistent memory writes. In addition, the LRT is non-volatile, so in an embodiment a larger write is performed (possibly after applying a data compression technique to the data to be written). Alternatively, two lines are preset, one to store the data and one to store the address the data was ment to be written into. Those skilled in the art will recognize that standard tools such as but not limited to look up tables or associative memories can be used to implement the circuits that will control and fulfill the operations for out-of-place writes.

In a further embodiment, enough memory to store the state of a processor and caches is always kept in the preset state. Upon detection of a system failure, such as power failure, the task of recording the failing state is expedited by writing to the memory in the preset state. This allows the system to reduce the checkpoint time in the situation where time is limited by the state of the battery. In an embodiment, once a successful restart happens, the check pointed region is again preset.

In a further embodiment, when the write bandwidth of the chip is power-limited, the write bandwidth is increased for any of the out-of-place write schemes by applying adaptive endurance coding (AEC) techniques to reduce the number of bits that must be RESET, at the trade-off of memory capacity. For example, if the out-of-place write region lines are 2× larger than the original lines, the average number of bits needed to be RESET to write compressed data can be decreased by 4×. Since the RESET write power is approximately proportional to the number of RESET bits per line times the number of lines written per second, the write bandwidth of a power-limited chip can be increased by an additional factor of 4× (assuming enough parallel write channels are provided on-chip). Even larger increases are possible if a larger expansion of the out-of-place memory lines (e.g., 3×-4×) is allowed, which might be particularly attractive when the required out-of-place write region is a small fraction of total memory size.

In another embodiment, depending on the behavior of the PCM material and the shape of the SET and RESET pulses, it could be the case that the total energy of a SET pulse is lower than the total energy of a RESET pulse. In such a case, the peak write bandwidth of a power-limited chip is increased by preRESETing lines and then selectively SETing cells during high-bandwidth write operations, rather than the previously described (reverse) situation where lines were preSET and then later selectively RESET.

Technical effects and benefits include the ability to improve write performance in a memory system by presetting selected memory lines to selected values.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method comprising:

using a computer system to identify a region in a phase change memory, the region comprising a plurality of memory cells characterized by a write performance characteristic that has a first expected value when a write operation changes a first current state of the memory cells to a desired state of the memory cells and a second expected value when a write operation changes a specified state of the memory cells to the desired state of the memory cells, wherein the second expected value is closer than the first expected value to a desired value of the write performance characteristic;

setting the plurality of memory cells in the region to the specified state; and writing data into the plurality of memory cells responsive to the setting, wherein each of the memory cells consist of one of a SET state and a RESET state and wherein the desired state is selected to be either the RESET state or the SET state based on which state has a longer writer latency.

2. The method of claim 1, wherein the identifying is performed by software executing on the computer system.

3. The method of claim 1, wherein a value of the write performance characteristic of a memory cell in the region is not dependent on a current state of other memory cells in the region.

4. The method of claim 1, wherein the write performance characteristic is at least one of latency and energy utilized.

5. The method of claim 1, wherein the desired state is a low resistance value state.

6. The method of claim 1, wherein the data is checkpoint data.

7. The method of claim 1, wherein the memory is a persistent memory.

8. The method of claim 1, wherein the writing is further responsive to a system failure and the data comprises system state data.

9. A method comprising:

using a computer system to identify a region in a phase change memory, the region comprising a plurality of memory cells characterized by a write performance characteristic that is based on a difference between a current state of the memory cells and a desired state of the memory cells, wherein each of the memory cells consist of one of a SET state and a RESET state;

setting all of the plurality of memory cells in the region to a common specified state, wherein the common specified state is selected to be either the RESET state or the SET state based on which state has a longer write latency;

receiving a write request, the write request comprising write data and specifying a write address in the phase change memory that does not correspond to the region;

determining whether the write request should be redirected to the region in the phase change memory, the determining responsive to a state of the computer system and to whether an expected value of the write performance characteristic for writing to the phase change region in the phase change memory is closer to a desired value of the write performance characteristic than an expected value of the write performance characteristic for writing to the specified write address;

responsive to determining that the write request should not be redirected to the region in the phase change memory, writing the write data into the phase change memory at the specified write address in the phase change memory; and responsive to determining that the write request should be redirected to the region in the phase change memory, writing the write data into the region in the phase change memory.

10. The method of claim 9, wherein the computer system is a memory controller.

11. The method of claim 9, wherein the identifying is performed by software executing on the computer system.

12. The method of claim 9, wherein upon determining that the write request should be redirected to the region in the phase change memory, a location within the region into which the write is redirected and the specified write address are stored in a line redirection table.

13. The method of claim 9, wherein the write performance characteristic is at least one of latency and energy utilized.

14. The method of claim 9, wherein upon determining that the write request should be redirected to the region in the phase change memory, a location within the region into which the write is redirected is stored at the specified write address in the phase change memory.

15. The method of claim 14, wherein the writing is performed with a fast write.

16. A system comprising:

a phase change memory comprising memory lines, each memory line comprising a plurality of memory cells, wherein each of the memory cells consist of one of a SET state and a RESET state;

a cache comprising cache lines corresponding to a subset of the memory lines; and a memory controller in communication with the phase change memory and the cache, the memory controller configured to perform a method that comprises scheduling a request to set all of the plurality of memory cells of the subset of the memory lines to a common specified state in response to a cache line attaining a dirty state wherein the dirty state indicates that contents of the memory line are outdated, wherein the common specified state is selected to be either the RESET state or the SET state based on which state has a longer writer latency.

17. The system of claim 16, wherein the method further comprises:
- receiving a read request at the memory controller;
- determining whether the read request can be serviced faster by temporarily canceling a request to set the cells of a memory line to a specified state;
- canceling the request to set the cells of the memory line to a common specified state responsive to determining that the read request can be serviced faster by temporarily canceling a request to set the cells of the memory line to a common specified state; and
- reinitiating the request to set the cells of the memory line to the common specified state responsive to the canceling and to a completion of the read request.

18. The system of claim 16, wherein the scheduling a request comprises placing the request on a queue, wherein the request is not scheduled when the queue is full.

19. The system of claim 16, wherein the scheduling a request comprises placing the request on a queue, wherein the request is postponed when the queue is full.

20. The system of claim 16, wherein determining is responsive to a state of the request to set the cells of the memory line to the specified state.

* * * * *